United States Patent [19]

Shirts et al.

[11] 3,985,555

[45] Oct. 12, 1976

[54] DECOMPOSITION OF CHALCOPYRITE

[75] Inventors: Monte B. Shirts, Centerville; Walter L. Staker, Salt Lake City, both of Utah

[73] Assignee: The United States of America as represented by the Secretary of the Interior, Washington, D.C.

[22] Filed: Jan. 23, 1975

[21] Appl. No.: 543,208

Related U.S. Application Data

[63] Continuation-in-part of Ser. No. 342,920, March 19, 1973, abandoned.

[52] U.S. Cl. ............................... 75/117; 75/101 R; 75/109; 423/48; 423/561; 423/562; 423/563
[51] Int. Cl.² .................... C22B 15/08; C22B 15/12
[58] Field of Search .................. 75/117, 109, 101 R; 423/48, 561, 562, 563

[56] References Cited
UNITED STATES PATENTS

| | | | |
|---|---|---|---|
| 1,523,444 | 1/1925 | Nevill et al. | 75/117 |
| 1,643,922 | 3/1924 | Christensen | 75/117 |
| 2,647,831 | 8/1953 | Allen et al. | 75/117 X |
| 3,637,371 | 1/1972 | Mackiw et al. | 75/117 X |
| 3,798,026 | 3/1974 | Milner et al. | 75/109 X |
| 3,891,522 | 6/1975 | McKay et al. | 75/117 X |

*Primary Examiner*—G. Ozaki
*Attorney, Agent, or Firm*—William S. Brown; Donald R. Fraser

[57] ABSTRACT

Chalcopyrite is decomposed by treatment with aqueous acid solution and a metallic reductant to form either metallic copper or copper sulfide, ferrous iron and hydrogen sulfide.

3 Claims, No Drawings

DECOMPOSITION OF CHALCOPYRITE

This application is a continuation-in-part of application Ser. No. 342,920, filed Mar. 19, 1973 and now abandoned.

Chalcopyrite, $CuFeS_2$, usually in the form of a concentrate containing about 70 to 90 percent of $CuFeS_2$, has been treated by a variety of prior art processes to decompose it to simple copper sulfides such as $CuS$ or $Cu_2S$. Copper can then be recovered from these sulfides by means of conventional hydrometallurgical processes such as leaching with an acid, e.g., hydrochloric or sulfuric, solution at low pressure and temperatures at or below 110° C. Metallic copper can then be recovered from the solution by electrolysis, cementation, etc. This is in contrast to direct acid leaching of chalcopyrite which generally requires temperatures in excess of 200° C and pressures in the range of 250-400 psi for rapid copper extraction.

Prior art processes for decomposition of chalcopyrite include those represented by the following reactions:

(1) 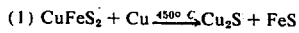  $CuFeS_2 + Cu \xrightarrow{450°C} Cu_2S + FeS$ (2) 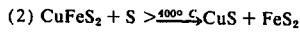  $CuFeS_2 + S \xrightarrow{>400°C} CuS + FeS_2$ (3) 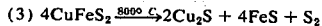  $4CuFeS_2 \xrightarrow{800°C} 2Cu_2S + 4FeS + S_2$ (4) 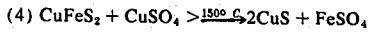  $CuFeS_2 + CuSO_4 \xrightarrow{>150°C} 2CuS + FeSO_4$ All of these processes, however, require large amounts of external heat, as well as intimate blending of reactants. Reaction (4) must also be carried out in absence of air.

It has now been found, according to the process of the invention, that chalcopyrite may be decomposed at atmospheric pressure, and at temperatures of 100° C or less, by reaction with acid in aqueous solution in the presence of a metallic reductant. In addition, exclusion of air or oxygen is not required. The process of the invention also has the advantage of removing at least half of the sulfur as $H_2S$ which may be readily recovered and converted to elemental sulfur. In addition, most of the iron present in the chalcopyrite is solubilized in the form of ferrous iron.

The acid employed in the process of the invention may be any aqueous mineral acid, with sulfuric or hydrochloric acids being preferred. The preferred metallic reductants are copper, iron or lead, or combinations thereof, though other metals such as nickel, chromium, aluminum or zinc may be used. Reactions involved when using copper, iron or lead are illustrated by the following equations:

(5) 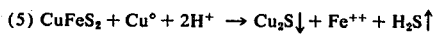  $CuFeS_2 + Cu° + 2H^+ \rightarrow Cu_2S\downarrow + Fe^{++} + H_2S\uparrow$ (6) 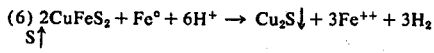  $2CuFeS_2 + Fe° + 6H^+ \rightarrow Cu_2S\downarrow + 3Fe^{++} + 3H_2S\uparrow$ (7) 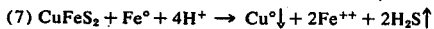  $CuFeS_2 + Fe° + 4H^+ \rightarrow Cu°\downarrow + 2Fe^{++} + 2H_2S\uparrow$ (8) 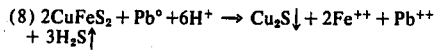  $2CuFeS_2 + Pb° + 6H^+ \rightarrow Cu_2S\downarrow + 2Fe^{++} + Pb^{++} + 3H_2S\uparrow$ (9) 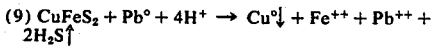  $CuFeS_2 + Pb° + 4H^+ \rightarrow Cu°\downarrow + Fe^{++} + Pb^{++} + 2H_2S\uparrow$ The starting material in the process of the invention consists essentially of the copper mineral, chalcopyrite. It may, however, contain varying amounts of other minerals, depending on the source of the ore and methods of concentration employed. Minerals that may be present but do not adversely affect the decomposition reaction include bornite, chalcocite, covellite, pyrite, galena, sphalerite, molybdenite, and various silicates.

The chalcopyrite ore, or concentrate, should be finely divided for optimum efficiency of the process, with a particle size of less than 100 mesh generally being suitable. Size reduction may be accomplished by any conventional process such as crushing, grinding, etc.

The aqueous acid solution preferably consists of a solution of sulfuric or hydrochloric acids. The amount and concentration of the acid should be sufficient to provide the hydrogen ions necessary for the conversion reactions (5) through (9). Concentrations of about 0.5 to 9 normal acid are generally suitable, but a range of about 1.5 to 4 normal is preferred. The amount of acid should generally be sufficient to provide a mole ratio of hydrogen ion to chalcopyrite in the range of about 2:1 to 20:1, preferably about 3:1 to 9:1. Optimum amount and concentration of the acid may vary considerably according to the specific nature of the chalcopyrite starting material, the specific acid and reductant employed and the temperature of the reaction, and are best determined experimentally.

A slurry is prepared by dispersing the finely divided chalcopyrite ore or concentrate in the aqueous acid solution in an amount up to about 250 grams per liter of solution. Optimum chalcopyrite content of the slurry will depend on the above-mentioned variables, as well as the iron solubility in the acid solution.

The metallic reductant may be used in a wide variety of forms, optimum form again depending on the above-discussed variables. Where the reductant is copper metal, it is preferably employed in a finely divided form, i.e., about 150 mesh or less. When metallic iron is used, it is preferably employed in a particle size of about 30 - mesh or coarser. Lead is preferably employed in about minus 65 - mesh particle size. Any of the metals may, however, be used in forms such as wool, sponge, shredded cans, turnings, or grindings.

Optimum mole ratios of reductant to chalcopyrite are also dependent on the above-discused variables. However, a range of about 1:1 to 4:1, preferably about 1.5:1 to 2:1, is generally satisfactory. Somewhat greater proportions of iron are generally required due to the tendency of the iron to react with the acid, as well as with the chalcopyrite. The reductant is admixed with the chalcopyrite - acid slurry by any conventional means, such as stirring, rotating drum, etc.

Although the individual metallic reductants generally give good results, a combination of two or more may be optimum under certain reaction conditions, e.g., metallic copper generally gives a more rapid decomposition reaction in the first 15 minutes. However, at times greater than 1 hour, metallic iron or lead generally give more complete decomposition of the chalcopyrite. Hence, the use of a combination of metallic copper with either iron or lead may give optimum results.

As discussed above, the process of the invention is carried out at desirably low temperatures, i.e., about 50° to 100° C. However, the reaction is generally more rapid at a temperature near the boiling point of the solution, i.e., about 100° C. Atmospheric pressure is generally satisfactory, although slight negative or positive pressures may be employed. Suitable reaction times may vary from a few minutes to about 6 hours, with about 1 hour generally being adequate to provide substantially complete decomposition of the chalcopyrite. Adequate agitation of the reaction mixture is generally provided by release of the H₂S gas reaction product. In fact, it has generally been found that the decomposition reaction is more efficient without additional agitation.

The reaction may be carried out in any conventional reaction vessel capable of providing the required temperature conditions, and being inert to the acidic solution. Suitable reaction vessel materials include steel lines with Teflon (polytetrafluroethylene), glass, high temperature plastic, and rubber. Recovery of the precipitated copper or copper sulfide is readily accomplished by conventional separation processes such as filtration or centrifugation.

The invention will be more specifically illustrated by the following examples.

EXAMPLE 1

Five grams of a commercial chalcopyrite concentrate, containing 80 percent chalcopyrite, and 2.7 grams of minus 200 mesh metallic copper dust were added to 200 ml of 1.6 molar $H_2SO_4$ solution and the contents stirred for 1 hour at 65° C (mole ratio $Cu^{++}$: $Cu^° = 1:2$). The percent conversion based on the amount of iron found in the solution at the end of the test was 81.5 percent. A duplicate test, without stirring, resulted in 95.2 percent conversion. Similar tests using 3.2 N HCl solutions gave similar results. In all tests sulfur extraction as H₂S was about 50 percent of the iron extraction, and the residue was microscopically shown to be predominately $Cu_2S$.

EXAMPLE 2

Five grams of the chalcopyrite concentrate of example 1 and 4.8 grams of 1/8-inch electrolytic iron chips were added to 200 ml of 3.2 N HCl solution and the contents stirred at 65° C for 1 hour (mole ratio of $Cu^{++}:Fe^° = 1:4$). The present conversion based on iron extracted from the chalcopyrite was 92.7 percent, and sulfur removed as H₂S gas was 90.8 percent. Microscopic evaluation of the residue showed that most of the copper was present as metallic copper.

EXAMPLE 3

Twenty grams of the chalcopyrite concentrate of example 1 and 36 grams of steel wool were agitated in 300 ml of 6 normal hydrochloric acid for 1 hour at 80° C. The extraction of iron from the chalcopyrite was 95 percent.

EXAMPLE 4

Five grams of the chalcopyrite concentrate of example 1 and 6.2 grams of minus 65-mesh lead was stirred for 3 hours at 96° C in 3.2 N HCl solution and then hot filtered. Conversion based on iron extracted was 94.2 percent and 88 percent of sulfur was removed as H₂S gas. Lead chloride precipitated out of the cool solution, and the residue by microscopic examination contained the copper in the metallic state.

We claim:
1. A process for decomposition of chalcopyrite comprising reacting the chalcopyrite with an aqueous hydrochloric acid solution and a metallic reductant consisting of iron or lead to form insoluble metallic copper, solubilize the iron in the chalcopyrite, and convert a major proportion of the sulfur in the chalcopyrite to gaseous hydrogen sulfide, the mole ratio of acid to chalcopyrite being in the range of about 3:1 to 9:1 and the mole ratio of reductant to chalcopyrite being in the range of about 1:1 to 4:1.
2. The process of claim 1 in which the metalic reductant is iron.
3. The process of claim 1 in which the metallic reductant is lead.

* * * * *